United States Patent
Zhou et al.

(10) Patent No.: US 9,053,735 B1
(45) Date of Patent: Jun. 9, 2015

(54) METHOD FOR FABRICATING A MAGNETIC WRITER USING A FULL-FILM METAL PLANARIZATION

(71) Applicant: Western Digital (Fremont), LLC, Fremont, CA (US)

(72) Inventors: Ronghui Zhou, Fremont, CA (US); Lily Yao, Hayward, CA (US); Masahiro Osugi, Sunnyvale, CA (US); Degang Cheng, Fremont, CA (US); Ming Jiang, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/310,360

(22) Filed: Jun. 20, 2014

(51) Int. Cl.
*B44C 1/22* (2006.01)
*G11B 5/84* (2006.01)
*G11B 5/31* (2006.01)

(52) U.S. Cl.
CPC ............... *G11B 5/84* (2013.01); *G11B 5/3116* (2013.01)

(58) Field of Classification Search
CPC .. G11B 5/3116; G11B 5/3163; G11B 5/1278; G11B 5/84
USPC ................................. 216/22; 438/3
See application file for complete search history.

(56) References Cited

U.S. PATENT DOCUMENTS

| | | | |
|---|---|---|---|
| 4,460,434 A | 7/1984 | Johnson et al. | |
| 4,662,985 A | 5/1987 | Yoshida et al. | |
| 5,091,048 A | 2/1992 | Thomas | |
| 5,744,400 A | 4/1998 | Dyer | |
| 5,953,578 A | 9/1999 | Lee | |
| 6,016,290 A | 1/2000 | Chen et al. | |
| 6,018,441 A | 1/2000 | Wu et al. | |
| 6,025,978 A | 2/2000 | Hoshi et al. | |
| 6,025,988 A | 2/2000 | Yan | |
| 6,032,353 A | 3/2000 | Hiner et al. | |
| 6,033,532 A | 3/2000 | Minami | |
| 6,034,851 A | 3/2000 | Zarouri et al. | |
| 6,043,959 A | 3/2000 | Crue et al. | |
| 6,046,885 A | 4/2000 | Aimonetti et al. | |
| 6,049,650 A | 4/2000 | Jerman et al. | |

(Continued)

FOREIGN PATENT DOCUMENTS

JP 61289635 12/1986

OTHER PUBLICATIONS

"Ion Mill Trimming/Etch Systems", Advanced Modular Systems, Inc., downloaded on Feb. 22, 2011 from http://dotnetgear.com/pub/products/ion-mill-trimmingetch-systems, 2 pages.
Zeuner et al., "IonScan 800—Ultra-precise film thickness trimming for Semiconductor Technology", Roth & Rau AG, Application Note Jan. 2007, 7 pages.
Roth & Rau MicroSystems, Department of Plasma and Ion Beam Technology, "Products and Applications", Roth & Rau AG, 8 pages.
Ming Jiang, et al., U.S. Appl. No. 13/909,774, filed Jun. 4, 2013, 27 pages.

*Primary Examiner* — Roberts Culbert

(57) ABSTRACT

A method fabricates a magnetic transducer having air-bearing surface (ABS) location and an intermediate layer having a trench therein. The trench has a shape and location corresponding to a main pole. The method includes depositing at least one main pole layer. A portion of the main pole layer(s) is in the trench. A refill layer is provided on the main pole layer(s). The main pole layer(s) may not be patterned after being provided and before the refill layer is provided. At least the refill layer is planarized. A full-film metal planarization is performed for at least one of the refill layer and the at least one main pole layer. The full-film metal planarization may include a bulk ion mill and/or ion beam scan.

22 Claims, 7 Drawing Sheets

(56) References Cited

U.S. PATENT DOCUMENTS

| | | |
|---|---|---|
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,288,357 B1 | 9/2001 | Dyer |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,426,296 B1 | 7/2002 | Okojie |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |

(56) References Cited

U.S. PATENT DOCUMENTS

| | | |
|---|---|---|
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Chen et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Spallas et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,885,528 B2 | 4/2005 | Hasegawa et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,355,825 B2 | 4/2008 | Oshima |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,398,592 B2 | 7/2008 | Le et al. |
| 7,417,832 B1 | 8/2008 | Erickson et al. |

(56) References Cited

U.S. PATENT DOCUMENTS

| | | |
|---|---|---|
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,441,325 B2 | 10/2008 | Gao et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,110,085 B2 * | 2/2012 | Hsiao et al. .................. 205/119 |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |

(56) References Cited

U.S. PATENT DOCUMENTS

| | | |
|---|---|---|
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 2003/0127424 A1 | 7/2003 | Clinton et al. |
| 2005/0057852 A1 | 3/2005 | Yazawa et al. |
| 2006/0198049 A1 | 9/2006 | Sasaki et al. |
| 2007/0035878 A1 | 2/2007 | Guthrie et al. |
| 2007/0037100 A1 | 2/2007 | Falterrmeier et al. |
| 2007/0138140 A1 | 6/2007 | Teng et al. |
| 2007/0263324 A1 | 11/2007 | Allen et al. |
| 2007/0268625 A1 | 11/2007 | Jiang et al. |
| 2008/0113514 A1 | 5/2008 | Baer et al. |
| 2010/0290157 A1 | 11/2010 | Zhang et al. |
| 2011/0042349 A1 | 2/2011 | Zhou et al. |
| 2011/0086240 A1 | 4/2011 | Xiang et al. |
| 2012/0111826 A1 | 5/2012 | Chen et al. |
| 2012/0162811 A1 | 6/2012 | Ishibashi et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2012/0304454 A1 | 12/2012 | Jiang et al. |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

\* cited by examiner

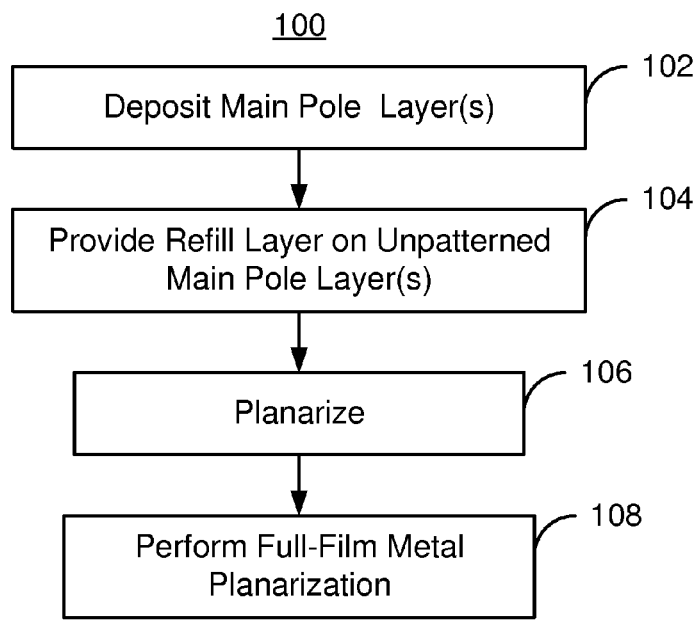
FIG. 3
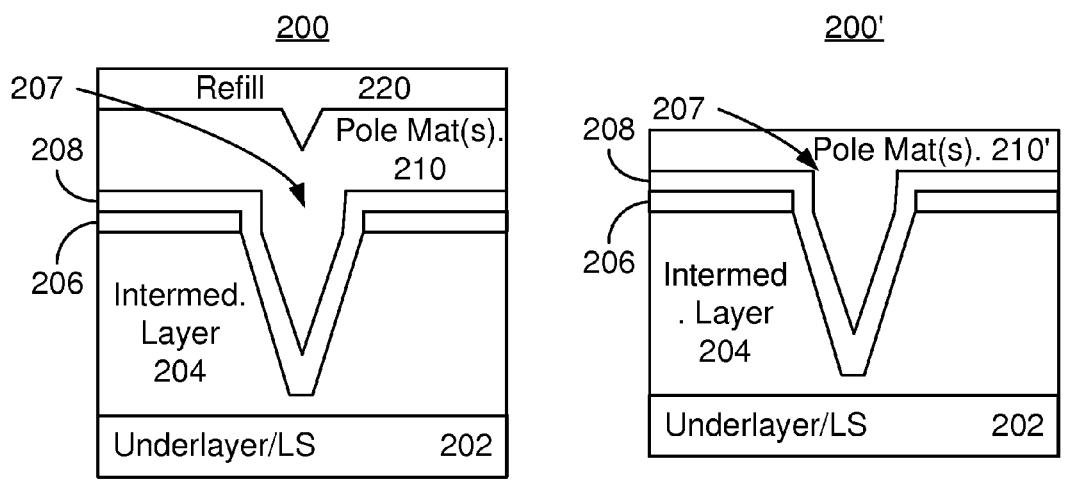
FIG. 4A
FIG. 4B

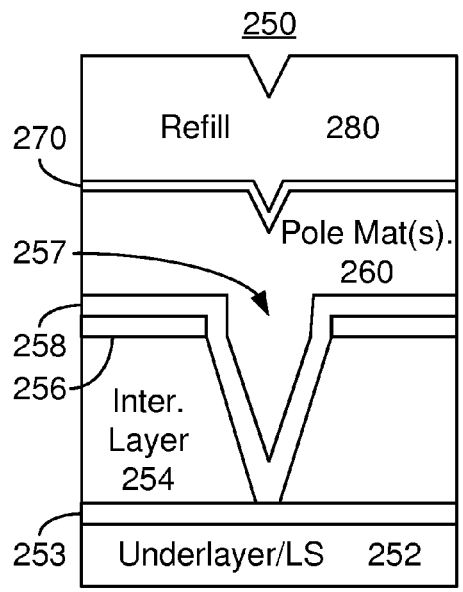
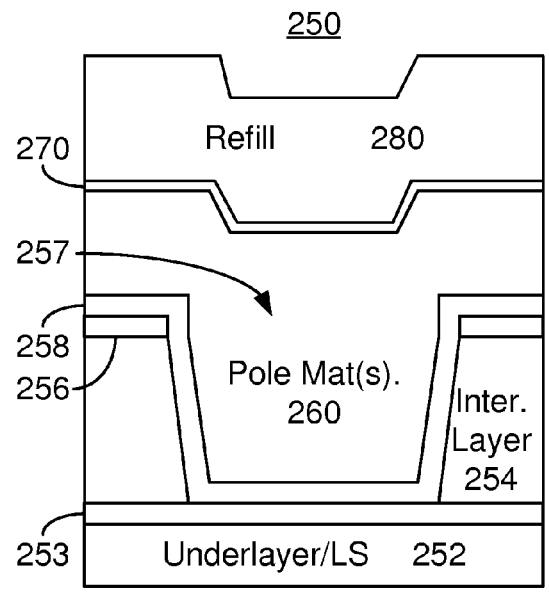
FIG.9A  FIG.9B
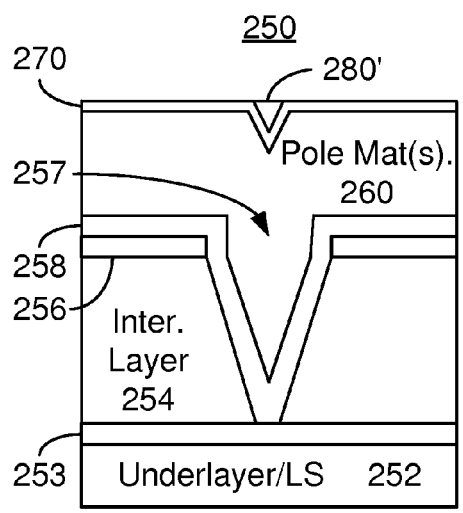
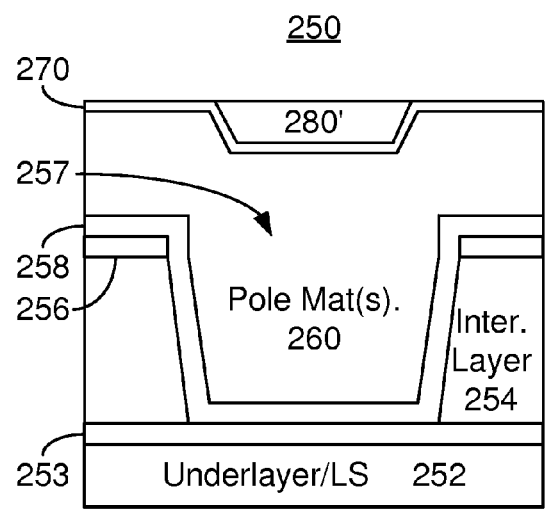
FIG.10A  FIG.10B

METHOD FOR FABRICATING A MAGNETIC WRITER USING A FULL-FILM METAL PLANARIZATION

BACKGROUND

FIG. 1 depicts an air-bearing surface (ABS) view of a conventional magnetic recording transducer 10. The magnetic recording transducer 10 may be a perpendicular magnetic recording (PMR) head. The conventional transducer 10 includes an underlayer 12, side gap 14, side shields 16, top gap 17, optional top, or trailing, shield 18 and main pole 20.

The main pole 20 resides on an underlayer 12 and includes sidewalls 22 and 24. The sidewalls 22 and 24 of the conventional main pole 20 form an angle with the down track direction at the ABS. The side shields 16 are separated from the main pole 20 by a side gap 14. The side shields 16 extend at least from the top of the main pole 20 to the bottom of the main pole 20. The side shields 16 also extend a distance back from the ABS.

Although the conventional transducer 10 functions, methods of improving performance and fabrication of the transducer 10 are desired.

BRIEF DESCRIPTION OF SEVERAL VIEWS OF THE DRAWINGS

FIG. 3 depicts a flow chart of an exemplary embodiment of a method for providing a magnetic recording transducer.

FIGS. 4A-4C depict ABS views of an exemplary embodiment of a magnetic recording transducer during fabrication.

DETAILED DESCRIPTION OF THE PREFERRED EMBODIMENTS

Figure 1:
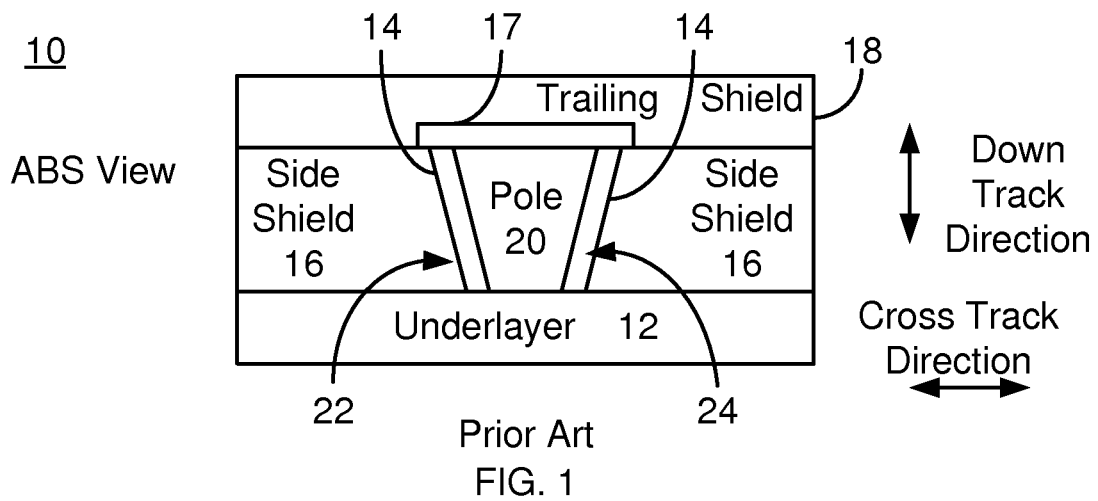
FIG. 1 depicts an ABS view of a conventional magnetic recording head.
Figure 2:
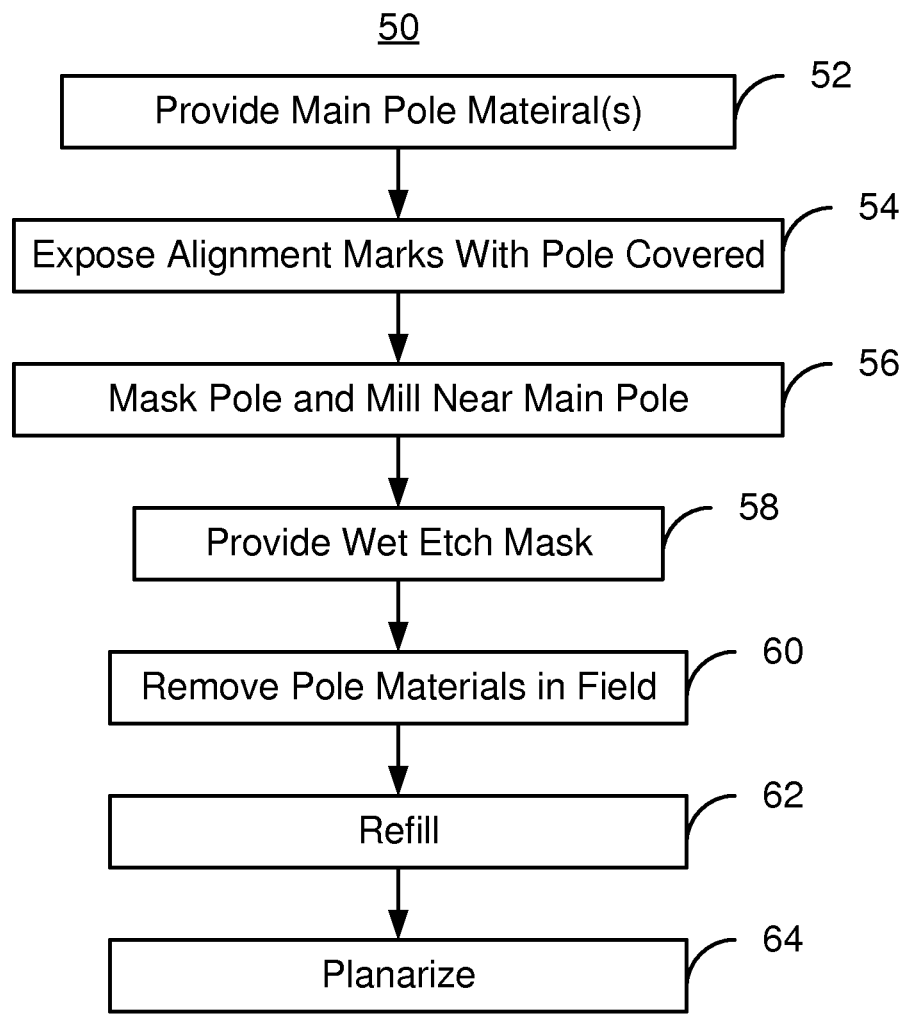
FIG. 2 depicts a flow chart of a more recently method for providing a transducer.

FIG. 2 is a flow chart depicting a more recently developed method for providing a main pole, such as the main pole 20, for the conventional transducer 10. The method 10 starts after a trench has been provided in a nonmagnetic layer and a seed layer has been deposited. The magnetic pole materials are provided, via step 52. Typically, a full film plating is performed. The plating step not only fills the trench, but also results in pole material(s) being deposited across the device and field regions. After the pole materials are plated, excess pole material is desired to be removed. For example, alignment marks may be desired to be exposed and the magnetic materials may be desired to be restricted to the trench to control the pole geometry. Consequently, a number of fabrication steps are performed. The alignment marks are exposed, via step 54. In step 54, the pole region is covered by a photoresist mask. Materials covering the alignment marks may then be removed without adversely affecting the main pole 20. This photoresist mask may then be removed. Another photoresist mask that covers the pole region is provided, via step 56. The mask has apertures near the trench for the main pole 20. Also in step 56, the pole materials exposed by the apertures are milled through. An etch mask is then provided, via step 58. The etch mask cover the top and sides (exposed by the milling in step 56) of the magnetic pole material(s) above the trench. A wet etch is performed to remove the pole material(s) in the field region, via step 60. Aluminum oxide is then deposited to refill the region around the pole. As a result, the pole materials are primarily above the trench. The remainder of the areas may be covered by the aluminum oxide. A chemical mechanical planarization (CMP) may then be performed, via step 64. Because the pole materials being planarized in step 64 are primarily above the trench for the main pole, the CMP of step 64 may be performed without requiring an undue amount of time to remove the magnetic materials for the pole.

Although the recently magnetic recording head 10 functions, there are drawbacks. The fabrication process is also rather complex and lengthy. As such, the potential for errors and reduced yield may be increased. These errors may be compounded as higher densities and, therefore, smaller geometries are desired. Accordingly, what is needed is a system and method for improving the performance of a magnetic recording head.

Figure 4C:
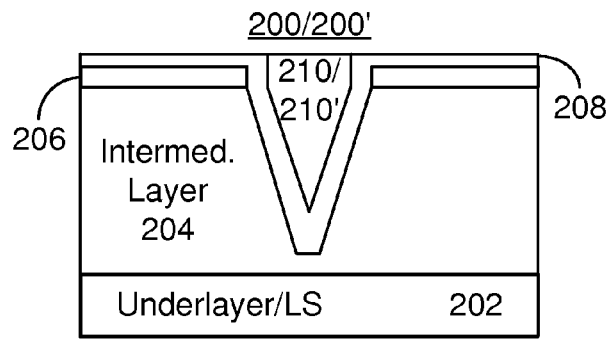

FIG. 3 depicts an exemplary embodiment of a method 100 for providing a magnetic recording transducer. For simplicity, some steps may be omitted, interleaved, combined and/or performed in another order. FIGS. 4A-4C depict an exemplary embodiment of a transducer 200 during fabrication using the method 100. For clarity, FIGS. 4A-4C are not to scale. The method 100 is also described in the context of providing a magnetic recording transducer 200 depicted in FIGS. 4A-4C. Although a single transducer is shown, the method 100 may be used to fabricate multiple magnetic recording heads at substantially the same time. The method 100 may also be used to fabricate other magnetic recording transducers. The method 100 is also described in the context of particular layers. A particular layer may include multiple materials and/or multiple sub-layers. The method 150 also may start after formation of other portions of the magnetic recording transducer. For example, the method 150 may start after a read transducer, return pole/shield and/or other structure have been fabricated. In addition, an intermediate layer, such as an aluminum oxide layer has been provided. In other embodiments, the intermediate layer may include multiple layers and/or other materials. A trench for the main pole has already been formed in the intermediate layer, for example via one or more reactive ion etches (RIEs). The trench has a shape and location corresponding to the main pole. In some embodiments, the transducer 200 has side shields and side gaps between the main pole and the side shield. These side gaps may have conformal and/or nonconformal portions. If nonconformal portions are included, then at least part of the trench has a different shape than the main pole. In addition, a seed layer, such as Ru and/or magnetic seed layer(s), may be deposited prior to the method 100 commencing.

The main pole layer(s) are provided, via step 102. In some embodiments, step 102 includes plating a high saturation magnetization material, such as CoFe. In other embodiments, processes, such as vacuum deposition, may be used. A portion of the main pole layer(s) reside in the trench.

A refill layer on the main pole layer(s), via step 104. In some embodiments, step 104 is performed without the at least one main pole layer being patterned after deposition. In other words, no patterning of the main pole layer may occur between steps 102 and 104. In other embodiments, however, the main pole may be patterned. In contrast to the more recently developed method 50, significant portions of the main pole layer(s), for example in the field, need not be removed. Step 104 may include depositing an aluminum oxide, silicon oxide, or other layer sufficiently thick to cover the main pole layers and provide a flat surface after planarization in step 106, discussed below. In some embodiments, the refill layer is provided directly on the main pole layer(s). However, other layer(s), such as a hard mask layer, may be provided between the main pole layer(s) and the refill layer in other embodiments.

At least the refill layer is planarized, via step 106. Step 106 may include performing a chemical mechanical planarization (CMP). In some embodiments, only the refill layer is removed in the planarization step. Stated differently, the planarization terminates within the refill layer. In other embodiments, a portion of the main pole layer(s) may also be removed. In such embodiments, the planarization terminates within the main pole layer(s). However, some portion of the main pole layer(s) still remain outside of the trench after such a planarization. FIG. 4A depicts an ABS view of an exemplary embodiment of the transducer 200 after step 106 is performed an in which the planarization terminates within the refill layer. Thus, an underlayer 202 that may include a leading shield (LS) is shown. The intermediate layer 204 having a trench 207 therein is also shown. Also depicted are a hard mask 206 used in forming the trench 207 and a seed layer 208. The pole materials 210 have been provided, as has the refill layer 220. Because of the planarization, the top of the refill layer 220 is substantially flat even though the top of the main pole layer(s) 210 is not. FIG. 4B depicts an ABS view of an exemplary embodiment of the transducer 200' after step 106 is performed an in which the planarization terminates within the main pole layer(s). The transducer 200' includes analogous components to the transducer 200. Consequently, such components have similar labels. In the transducer 200', the pole material(s) 210' have also been planarized. Consequently, the top surface of the main pole layer(s) 210' is substantially flat. Note, however, that a substantial amount of the main pole layer(s) 210' remain outside of the trench 207.

A full-film metal planarization is performed for the refill layer and/or the main pole layer(s) 210/210', via step 108. A full-film metal planarization is capable of removing metal layers, such as the main pole layer(s). Further, the full-film metal planarization of step 108 may be a dry process, as opposed to a CMP which utilizes a slurry. In some embodiments, the full-film planarization may remove the refill layer 220 at a different rate than the main pole layer(s) 210/210'. In other embodiments, the full-film metal planarization is configured to be material neutral. For example, the removal rates of the refill layer 220 and the main pole layer(s) 210/210' may be substantially the same. Techniques that may be used to perform the full-film metal planarization include a bulk ion mill and an ion beam scan. One or both of these techniques might be used. For example, an ion beam scan only may be used for the full-film planarization. In other embodiments, a bulk ion mill may be performed followed by an ion beam scan. The bulk ion mill and the ion beam scan may be configured using the milling angle and, therefore, beam size. For a bulk ion mill, the beam size is at least as large as the wafer on which the transducer resides. An ion beam scan, in contrast, has an ion beam size that is smaller than the wafer size. For example, the beam size may be at least ten millimeters and not more than fifty millimeters in diameter. In some such embodiments, the ion beam is at least fifteen millimeters and not more than twenty millimeters in diameter. Note that although the term "diameter" is used, the ion beam need not have a circular cross-section. The beam size may be set, at least in part, by the angle the ion beam makes with perpendicular to the surface of the refill layer or pole layers. In some embodiments, this ion beam angle is at least zero degrees and not more than eighty degrees. In some such embodiments, the ion beam angle is at least twenty-five degrees and not more than fifty-five degrees. This thirty degree range of angles may be capable of producing a material-neutral full-film metal planarization.

The full-film metal planarization performed in step 108 may also be capable of removing the pole layer(s) and refill layer at a sufficiently high rate while producing an acceptable post-planarization root mean square height variation ($\sigma$). In some embodiments, the $\sigma$ for the full-film metal planarization may be not more than seven nanometers. In some such embodiments, the post planarization $\sigma$ may be not more than five nanometers. In other embodiments, the post planarization $\sigma$ may be not more than two nanometers. Further, the milling rate may be sufficient for manufacturing. In some embodiments, for example, the removal rate is greater than forty nanometers per minute for both the pole layer(s) 210/210' and the refill layer 220. In some embodiments, this rate may be approximately ten times faster than a pure metal CMP. However, other removal rates are possible. FIG. 4C depicts an ABS view of an exemplary embodiment of a transducer 200/200' after step 108 is performed. Because of the full-film metal planarization, the transducer 200/200' looks the same regardless of where in the layers 210 and 220 the planarization of step 106 was terminated. As can be seen in FIG. 4C, the full-film planarization has removed all of the pole material(s) outside of the trench 207. Thus, the pole 210/210' remains.

Fabrication of the transducer 200/200' may then be completed. For example, if the full-film planarization performed in step 108 is not material neutral, then an additional planarization, such as a CMP, may be performed. A portion of the pole 210/210' near the ABS may be removed to form a trailing (top) bevel. Other structures, such as side gaps, side shields, trailing shield(s) and/or other structures may also be formed.

Using the method 100, a magnetic transducer having improved performance may be fabricated. Because the full-film metal planarization is used in step 108, fabrication of the transducer 200/200' may be simplified. For example, a number of processes in the recently developed method 50 may be omitted. Because processing is simplified, variations in the geometry of the pole 210/210' due to processing may be mitigated or avoided. Thus, performance of the transducer 200/200' may be improved and the yield for the method 100 improved.

Figures 5A, 5B:
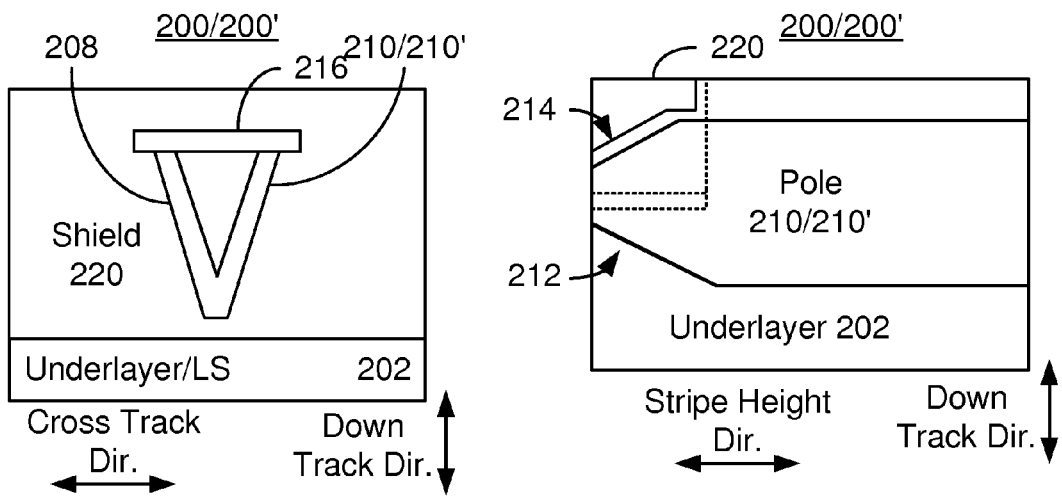
FIGS. 5A-5C depict ABS and apex views of an exemplary embodiment of a transducer and side views of an exemplary embodiment of a disk drive fabricated using the method.
Figure 5C:
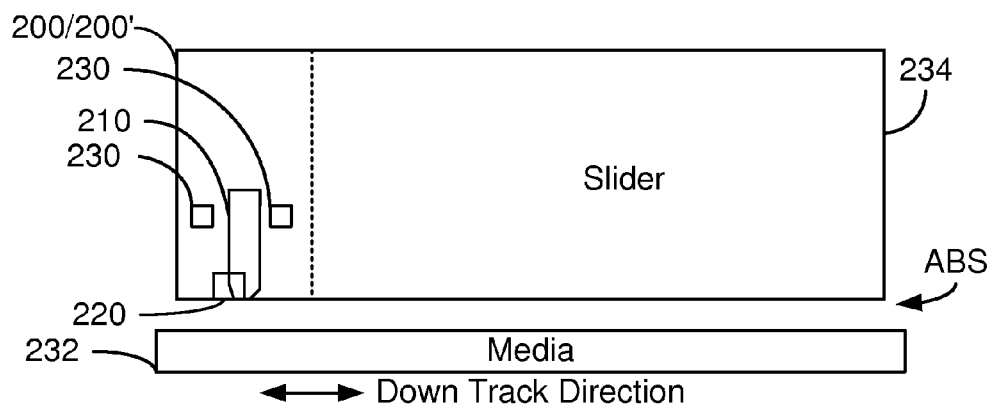

FIGS. 5A, 5B and 5C depict various views of the transducer 200/200' after manufacturing using the method 100 has been completed. FIGS. 5A and 5B depict ABS and apex (side/cross-sectional) views of the transducer 200/200'. FIG. 5C depicts a side view of the disk drive. For clarity, FIGS. 5A-5C are not to scale. For simplicity not all portions of the disk drive and transducer 200/200' are shown. In addition, although the disk drive and transducer 200/200' are depicted in the context of particular components other and/or different components may be used. For example, circuitry used to drive and control various portions of the disk drive is not shown. For simplicity, only single components are shown. However, multiples of each components and/or their sub-components, might be used. The disk drive may be a perpendicular magnetic recording (PMR) disk drive. However, in other embodiments, the disk drive may be configured for other types of magnetic recording included but not limited to heat assisted magnetic recording (HAMR).

The disk drive includes a media 232, and a slider 234 on which the transducer 200/200' has been fabricated. Although not shown, the slider 234 and thus the transducer 200/200' are generally attached to a suspension. In general, the slider 234 includes the write transducer 200/200' and a read transducer (not shown). However, for clarity, only the write transducer 200/200' is shown.

In addition to the components described previously, the transducer 200/200' includes a write gap 216 and a wraparound shield 220. In other embodiments, the side shields may be separated from the trailing shield. In other embodiments, the trailing portion of the shield 220 may be omitted. Also shown are coils 230 that are used to energize the main pole 210/210'. A portion of the intermediate layer 204 depicted in FIGS. 4A-4C has been removed during formation of the shield 220.

Because the transducer 200/200' has been formed using the method 100, yield for and manufacturing of the transducer 200/200' may be improved. Further, variations in the geometry of the pole 210/210' due to processing may be mitigated or avoided. Thus, performance of the transducer 200/200' may be improved.

Figure 6:
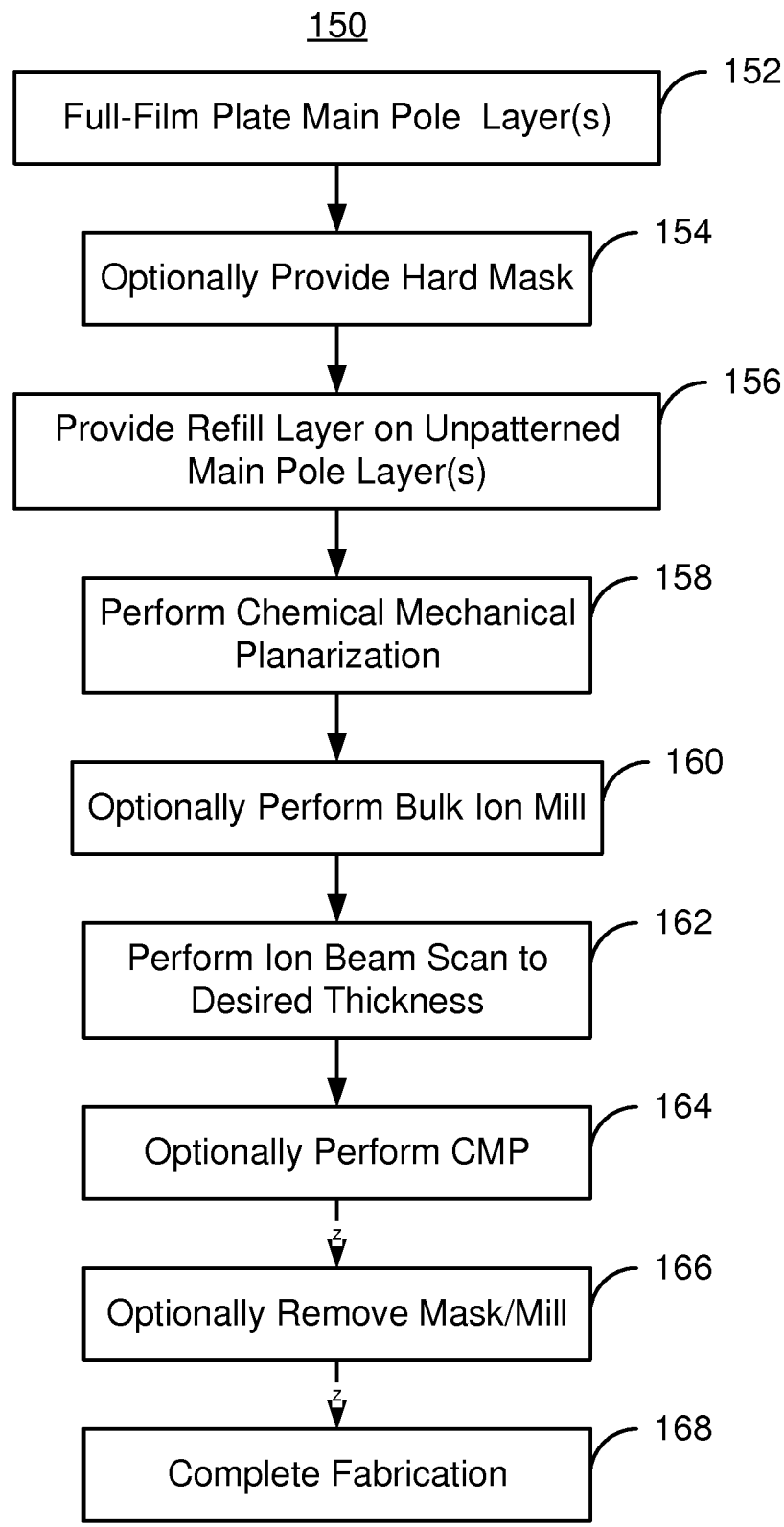
FIG. 6 depicts a flow chart of another exemplary embodiment of a method for providing a magnetic pole in a magnetic recording transducer.

FIG. 6 depicts an exemplary embodiment of a method 150 for providing a pole for a magnetic recording transducer using a full-film metal planarization. For simplicity, some steps may be omitted, interleaved, performed in another order and/or combined. FIGS. 7A-7B through 12A-12B depict ABS and recessed views of a transducer 250 fabricated using the method 150. The method 150 is thus described in the context of providing a magnetic recording transducer 250 depicted in FIGS. 7A-7B through 12A-12B. The method 150 may be used to fabricate multiple magnetic recording heads at substantially the same time. The method 150 may also be used to fabricate other magnetic recording transducers. The method 150 is also described in the context of particular layers. A particular layer may include multiple materials and/or multiple sub-layers. The method 150 also may start after formation of other portions of the magnetic recording transducer. For example, the method 150 may start after a read transducer, return pole/shield and/or other structure have been fabricated. The method 150 also starts after an intermediate layer, such as aluminum oxide, has been deposited and a trench for the main pole has been formed therein. In addition, a seed layer has also been provided in the trench. The seed layer may be nonmagnetic, such as Ru, and/or may include other nonmagnetic or magnetic material(s).

Figure 7A:
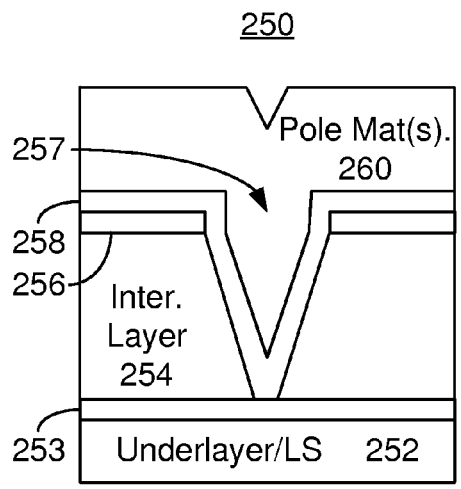
FIGS. 7A-7B through 12A-12B depict ABS and recessed/yoke views of an exemplary embodiment of a magnetic recording transducer fabricated using the method.
Figure 7B:
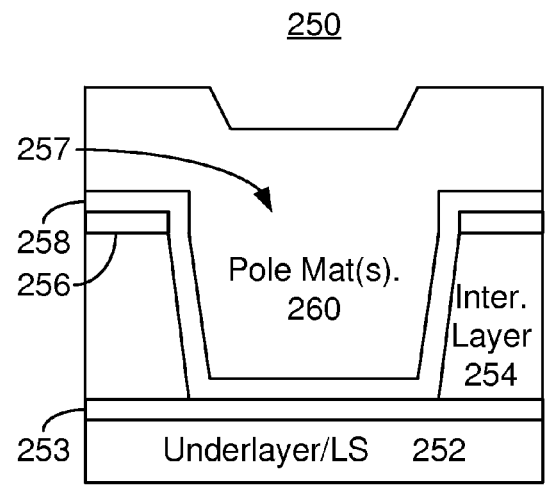

The material(s) for the main pole are full film plated, via step 152. Step 152 includes electroplating high saturation magnetization magnetic material(s). For example, CoFe may be plated in step 152. In other embodiments, other deposition methods in addition to or in lieu of plating may be used. FIGS. 7A and 7B depict ABS and recessed (e.g. yoke) views of the transducer 250 after a step 152 has been performed. An underlayer 252 that may include a leading shield, etch stop layer 253 and intermediate layer 254 are thus shown. A mask 256 has been provided for formation of the trench 257. Also shown are the seed layer 258 and pole material(s) 260. As can be seen in FIGS. 7A and 7B, the top surface of the pole material(s) 260 is not flat because of the underlying topology. The thickness of the pole material(s) 260 is greater than the depth of the trench 257. In some embodiments, several microns of CoFe may be provided in step 152.

Figure 8A:
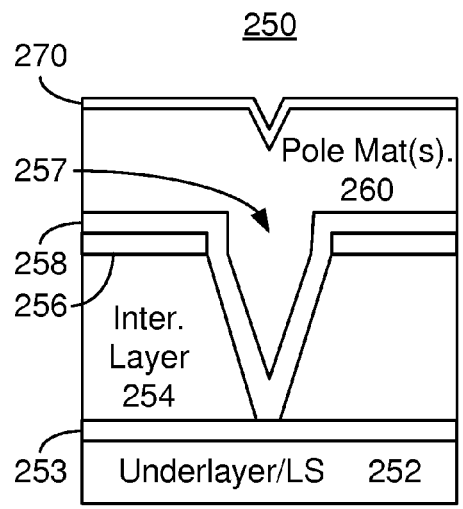
Figure 8B:
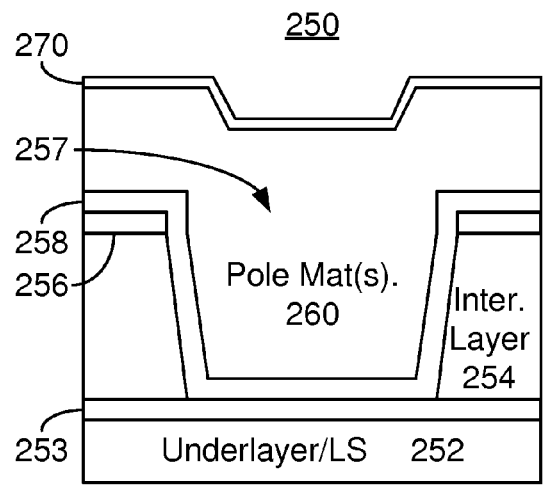

A hard mask may optionally be provided, via step 154. The hard mask may include one or more inert materials such as Cr, Ta and/or Ru. The hard mask may be thin. For example, the hard mask may be less than twenty nanometers thick. FIGS. 8A and 8B depict ABS and recessed views of the transducer 250 after step 154 is performed. Thus, a hard mask layer 270 has been provided. In the embodiment shown, deposition of the hard mask layer 270 is conformal and the hard mask layer 270 is relatively thin. Thus, the top surface of the hard mask layer 270 is not flat. Instead, the top surface of the hard mask layer 270 still reflects the presence of the trench 257/the underlying topology.

A refill layer is provided on the main pole layers, via step 156. In some embodiments, the main pole layers are not patterned. Thus, the deposition in step 156 may be a full film deposition that covers the main pole material(s) 260 and, if present, the hard mask layer 270. Step 156 may include depositing a thick aluminum oxide or silicon oxide layer. For example, in some embodiments, the refill layer may be approximately the same thickness as the main pole material(s) 260. In other embodiments, the refill layer may be thicker than the main pole material(s) 260. FIGS. 9A and 9B depicts ABS and recessed views of the transducer 250 after step 156 has been performed. Thus, a refill layer 280 is present. However, the top surface of the refill layer 280 may still reflect variations in the underlying layers. Thus, a planarization is performed, via step 158. Step 158 may include performing a CMP. The refill material may be relatively quickly removed by the CMP. Thus, performing the CMP in step 158 may not significantly complicate or slow processing. In some embodiments, the CMP terminates within the refill layer 280. In other embodiments, the CMP terminates within the pole material(s) 260. In such embodiments, however, some pole material remains outside of the trench 257. In embodiments in which the hard mask 270 is used, the CMP in step 158 generally terminates at the hard mask layer 270. FIGS. 10A and 10B depict the transducer 250 after step 158 is performed. Thus, part of the refill layer has been removed, leaving refill 280'. The top surface of the transducer 250 formed by the refill 280' and the hard mask 270 is substantially flat. However, a significant portion of the pole material(s) 260 are desired to be removed.

Figure 11A:
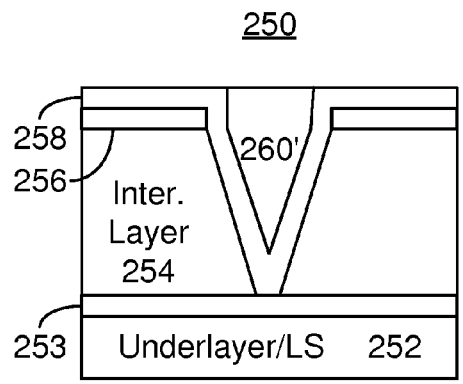
Figure 11B:
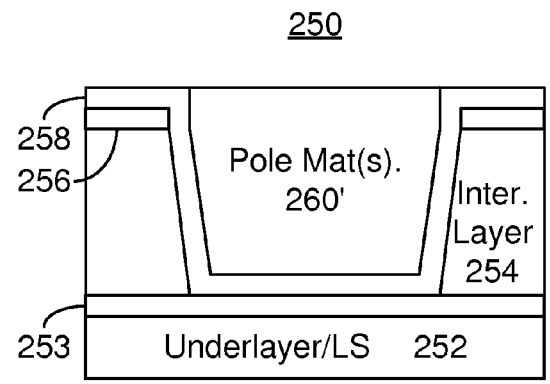

A bulk ion mill may optionally be performed, via step 160. The bulk ion mill utilizes a beam size that is not less than the wafer size. Further, the bulk ion mill removes not only the hard mask layer 270, but also a portion of the pole material(s) 260. The bulk ion mill may terminate while some of the pole material(s) 260 remain outside of the trench 257. Although the surface of the pole material(s) 260 is substantially flat after the bulk ion mill, in some embodiments, the post-planarization root mean square variation in height (a) of the transducer 250 may be greater than desired. An ion beam scan may thus be performed, via step 162. The beam size used in step 162 may be analogous to that described above. For example, in some embodiments, the ion beam diameter is at least fifteen and not more than twenty millimeters. In some embodiments, step 160 and 162 are configured to be material neutral. However, in other embodiments, steps 160 and/or 162 may not be material neutral. In embodiments in which step 160 is performed, then step 162 occurs after the bulk ion mill of step 160. In such embodiments, the ion scan removes less of the pole material(s) 260 because a portion of the pole material(s) has been remove by the bulk ion mill. In other embodiments in which step 160 has been omitted, step 162 removes all of the pole material(s) 260 desired to be removed and removes the hard mask 270. Further, the surface of the transducer 250 may be substantially flat after step 162 is performed. In some embodiments, the a is not more than seven nanometers after step 162 is performed. In some such embodiments, a is less than or equal to five nanometers. In other embodiments, a may be less not more than two nanometers. Thus, step 162 in combination with step 160 (if not omitted) may be viewed as performing a full-film metal planarization. FIGS. 11A and 11B depict ABS and recessed views of the transducer 250 after step 162 is performed. Thus, the pole materials outside of the trench 257 (not labeled in FIGS. 11A-12B for clarity) have been removed. The pole material(s) 260' remain. Further, the surface may be substantially flat.

Figure 12A:
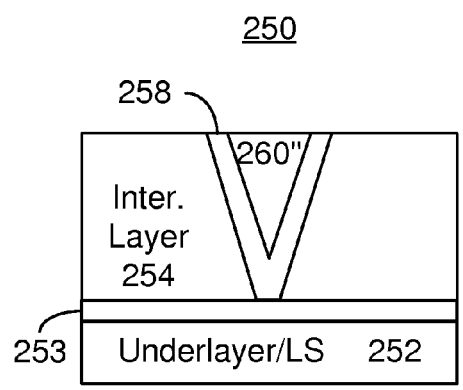
Figure 12B:
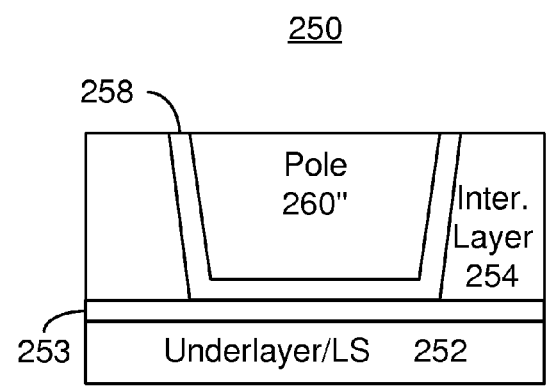

A CMP may optionally be performed, via step 164. Step 164 may be desired to be performed if steps 160 and 162 are not material neutral. In such embodiments, the region above the pole material(s) 260' may protrude slightly. Thus, a brief CMP may provide the desired a. The mask 256 and seed layers 258 may optionally be removed, via step 166. For example, the pole material(s) 260' may be covered by a mask and a mill performed. In other embodiments, step 166 may be omitted. FIGS. 12A and 12B depict the transducer 250 after step 166 is performed. Thus, the mask layer 260 and a portion of the seed layer 258 have been removed.

Fabrication of the transducer 250 may then be completed, via step 168. For example, a trailing bevel may be formed in the pole 260' and/or other structures fabricated. Using the method 150, the transducer 250 may be provided. Thus, the benefits of the method 150 and transducer 250 may be achieved. For example, simplified processing, improved yield, reduced variations in geometry and enhanced performance may be attained.

We claim:

1. A method for fabricating magnetic transducer having air-bearing surface (ABS) location and an intermediate layer having a trench therein, the trench having a shape and location corresponding to a main pole, the method comprising:
   depositing at least one main pole layer, a portion of the at least one main pole layer residing in the trench;
   providing a refill layer on the at least one main pole layer;
   planarizing at least the refill layer; and
   performing a full-film metal planarization for at least one of the refill layer and the at least one main pole layer.

2. The method of claim 1 wherein the step of providing the refill layer further includes
   depositing the refill layer without the at least one main pole layer being patterned after deposition and before the refill layer is provided.

3. The method of claim 1 further comprising:
   providing a hard mask layer, the hard mask layer residing between the refill layer and the at least one main pole layer.

4. The method of claim 1 wherein the full-film metal planarization is material neutral.

5. The method of claim 4 wherein the full-film metal planarization removes the refill layer at a first rate and the at least one main pole layer at a second rate, the first rate being substantially the same as the second rate.

6. The method of claim 1 wherein the step of performing the full-film metal planarization has a post-planarization root mean square height variation of not more than seven nanometers.

7. The method of claim 6 wherein the post-planarization root mean square height variation is not more than five nanometers.

8. The method of claim 6 wherein the post-planarization root mean square height variation is not more than two nanometer.

9. The method of claim 1 wherein the step of performing the full-film metal planarization further includes:
   performing at least one of a bulk ion mill and an ion beam scan.

10. The method of claim 9 wherein the step of performing the full-film metal planarization further includes:
    performing the ion beam scan only.

11. The method of claim 9 wherein the step of performing the full-film metal planarization further includes:
    performing the bulk ion mill to remove a first portion of at least one of the refill layer and the at least one main pole layer;
    performing the ion beam scan after the bulk ion mill to remove a second portion of the at least one of the refill layer and the at least one main pole layer.

12. The method of claim 9 wherein the magnetic transducer resides on a wafer having a wafer size, wherein the bulk ion mill utilizes a first ion beam size not less than the wafer size and wherein the ion beam scan utilizes a second ion beam size less than the wafer size.

13. The method of claim 12 wherein the second ion beam size is at least ten millimeters and not more than fifty millimeters in diameter.

14. The method of claim 13 wherein the second ion beam size is at least fifteen millimeters and not more than twenty millimeters in the diameter.

15. The method of claim 12 wherein the refill layer has a top surface and wherein the ion beam scan is at an angle from perpendicular to the top surface of at least zero degrees and not more than eighty degrees.

16. The method of claim 15 wherein the angle is at least twenty-five degrees and not more than fifty-five degrees.

17. The method of claim 1 wherein the refill layer includes at least one of aluminum oxide and silicon oxide and the at least one main pole layer includes CoFe.

18. The method of claim 1 wherein the planarizing step terminates within the refill layer.

19. The method of claim 1 wherein the planarizing step terminates within the at least one main pole layer.

20. The method of claim 1 further comprising:
    performing a chemical mechanical planarization after the full-film metal planarization.

21. A method for fabricating magnetic transducer having air-bearing surface (ABS) location and an intermediate layer having a trench therein, the trench having a shape and location corresponding to a main pole, the magnetic transducer residing on a wafer having a wafer size, the method comprising:
    plating at least one main pole layer, a portion of the at least one main pole layer residing in the trench, the main pole layer including CoFe;
    providing a refill layer on the at least one main pole layer without the at least one main pole layer being patterned after deposition and before the refill layer is provided, the refill layer including at least one of aluminum oxide and silicon oxide;
    planarizing at least the refill layer and the at least one main pole layer; and
    performing a full-film metal planarization, the full-film metal planarization being material neutral and having a post-planarization root mean square height variation of not more than seven nanometers, the step of performing the full-film metal planarization further including
    performing the bulk ion mill to remove a first portion of at least one of the refill layer and the at least one main pole layer, the bulk ion mill utilizing a first ion beam size not less than the wafer size;
    performing the ion beam scan after the bulk ion mill to remove a second portion of the at least one of the refill layer and the at least one main pole layer, the ion beam scan utilizing a second ion beam size less than the wafer size, the second ion beam size being at least fifteen millimeters and not more than twenty millimeters in diameter.

22. The method of claim 21 further comprising:
    providing a hard mask layer, the hard mask layer residing between the refill layer and the at least one main pole layer.

* * * * *